United States Patent [19]

Brady et al.

[11] Patent Number: 4,538,834
[45] Date of Patent: Sep. 3, 1985

[54] TUBULAR ASSEMBLY FOR TRANSFERRING FLUIDS

[75] Inventors: Joseph H. Brady, Telford; Albert A. Koenig, Coatesville; Harry Straub, King of Prussia, all of Pa.

[73] Assignee: General Electric Co., Philadelphia, Pa.

[21] Appl. No.: 416,410

[22] Filed: Sep. 9, 1982

[51] Int. Cl.³ .............................................. F16L 17/00
[52] U.S. Cl. ........................................ 285/10; 285/47; 285/55; 285/138
[58] Field of Search ................. 285/10, 11, 41, 138, 285/47, 53, 55, 133 R, 133 A; 138/114, 149, 155, 109

[56] References Cited

U.S. PATENT DOCUMENTS

| 570,169 | 10/1896 | Greenfield | 138/148 |
| 1,005,751 | 10/1911 | Schweitzer | 285/10 |
| 2,419,278 | 4/1947 | Motsenbucker | 285/47 X |
| 2,895,512 | 7/1959 | Forsyth et al. | 138/87 |
| 2,924,245 | 2/1960 | Wilson | 138/149 |
| 3,275,345 | 9/1966 | Waldron et al. | 285/47 |
| 3,705,734 | 12/1972 | Rajakovics | 285/41 |
| 3,877,488 | 4/1975 | Baturay | 285/11 X |
| 3,885,595 | 5/1975 | Gibson et al. | 138/155 |
| 3,952,777 | 4/1976 | Uhlig | 138/149 |
| 4,047,742 | 9/1977 | Haferkamp | 285/47 X |
| 4,396,211 | 8/1983 | McStravick et al. | 285/47 |
| 4,415,184 | 11/1983 | Stephenson | 285/47 |

FOREIGN PATENT DOCUMENTS

| 12057 | 6/1980 | European Pat. Off. | 285/47 |
| 291644 | 6/1928 | United Kingdom | 285/47 |
| 465000 | 3/1975 | U.S.S.R. | 285/138 |

Primary Examiner—Dave W. Arola
Attorney, Agent, or Firm—Allen E. Amgott; Robert C. Lampe, Jr.

[57] ABSTRACT

A tubular assembly for transferring fluids in relative isolation from the ambient environment is disclosed. The assembly includes at least two similar conduit sections. Each conduit section has contoured ends which may be frusto-conical in shape. Means for joining the two conduit sections end-to-end are provided which position conforming contoured ends in mutually confronting, spaced relationship. In one embodiment, the assembly and the interspace formed by the space, conforming surfaces are oriented such that the condensate of the fluid flowing through the assembly is trapped in the interspace thereby forming a thermal barrier between the fluid flowing through the assembly and the ambient environment.

5 Claims, 4 Drawing Figures

TUBULAR ASSEMBLY FOR TRANSFERRING FLUIDS

This invention relates in general to tubular assemblies for the transport of fluid therethrough and in particular to a multiple-section conduit assembly adapted to carry a fluid in relative isolation from its ambient environment.

BACKGROUND OF THE INVENTION

Prior art tubular assemblies for the transfer of hot or cold fluids use inner and outer pipes with insulation in the annular space therebetween. These assemblies are utilized in many ways, such as for the enhanced recovery of oil from an oil well by the injection of steam. The conduit sections of prior art assemblies isolate the fluid passing through their inner pipes from the ambient environment and thus provide a relatively effective thermal barrier therebetween.

However, the joints between successive conduit sections provide paths that allow a relatively high degree of heat transfer between the inner pipe, which is normally at the temperature of the fluid, and the outer pipe which is near the temperature of the ambient environment. The term 'joint', as used herein, is intended to include the immediate coupling as well as those portions of each conduit section which are proximate thereto.

When fluids, which are at a high temperature and pressure relative to the ambient environment, are transferred through the conduit assembly, the joint between successive conduit sections is required not only to contain the fluid within the assembly, but must also withstand the thermal expansion and/or contraction of the inner pipe relative to the outer pipe. Still further requirements must be complied with as the situation dictates. Thus, each joint area of a multiple-section conduit assembly for the enhanced recovery of oil by steam injection must (1) thermally isolate the steam from the surrounding environment; (2) prevent leakage and maintain the steam pressure at an acceptable level; (3) allow for the expansion of the inner pipes relative to each other and relative to the cooler outer pipes; (4) support the hanging weight of substantially all the conduit sections strung vertically below the joint; and (5) be rugged enough to withstand repeated assembly and disassembly operations. Similar problems are presented when fluids are transferred at very low temperatures and pressures relative to the ambient environment.

Typically, the joints of prior art assemblies provide a poorer thermal barrier than the remainder of the conduit section through which the fluid passes. For example, the joints shown in U.S. Pat. No. 3,275,345, incorporated herein by reference, include frusto-conical members, one being affixed to the corresponding ends of the pipes at each end of a conduit section. Each pair of members supports the inner and outer pipes in a spaced, coaxial relationship and, further, it transfers the expansion and contraction forces developed by the heating and cooling of the inner pipe relative to the outer pipe. As shown in the patent, successive conduit sections are joined together by bolts passed through flanges affixed to the exterior of the outer pipe. The flanges maintain a space or gap between the inner pipes of the conduit sections. The frusto-conical members form a wedge-shaped space at the joint which communicates with the interior of the inner pipes through the aforementioned gap. The fluid in the inner pipe is allowed to fill this wedge-shaped space through the gap and come into contact with the surfaces of the frusto-conical members and the outer pipe.

Although the frusto-conical members transfer the expansion/contraction forces developed in the inner pipe to the outer pipe efficiently, a relatively poor thermal barrier exists at each joint resulting from contact of the fluid with the outer pipes, the frusto-conical members, and the flange of the joint. Thus, the thermal efficiency of the entire assembly is diminished.

Still, other prior art assemblies include joints in which two conforming frusto-conical surfaces mate in the manner of a bayonet type joint. In the latter assembly, the inner pipes of the respective conduit sections are sealed together by a liquid seal between the end surfaces of each inner pipe. An expansion mechanism is provided near the inner pipe joint to allow for the expansion/contraction of the inner pipe relative to the outer pipe. The conical surfaces of the mated pair of frusto-conical members in the aforementioned assembly are closely fitted together and sealed to each other. Hence, fluid carried by the assembly is isolated within the inner pipes and away from the outer pipes as well as from any further joining means attached thereto. The repeated assembly and disassembly of the latter prior art structure is difficult and expensive.

OBJECTS OF THE INVENTION

An object of this invention is to provide an improved conduit section in a multiple-section conduit assembly for the transport of fluid in relative isolation from the ambient environment which is not subject to the foregoing disadvantages and limitations.

A further object of this invention is to provide a multiple-section conduit assembly having improved joints which are easier and hence less expensive to manufacture than prior art devices.

An additional object of this invention is to provide a relatively long heat transfer path at the joints between the fluid in the interior of the inner pipe and the ambient environment.

Another object of this invention is to provide a multiple-section conduit assembly having joints capable of utilizing the condensate of the fluid as a thermal barrier when the assembly is operating in a substantially vertical position.

Still a further object of this invention is to provide a jointed multiple-section conduit assembly which is able to undergo multiple assembly and disassembly operations, yet maintain its thermal insulative qualities.

SUMMARY OF THE INVENTION

One embodiment of a jointed multiple-section conduit assembly is disclosed wherein each conduit section includes an inner pipe, for carrying a fluid, and an outer pipe which coaxially surrounds the inner pipe to define an annular space therebetween. The pipes are axially displaced with respect to each other such that the first and second ends of the inner pipe lead and lag respectively, the corresponding ends of the outer pipe. A pair of frusto-conical structures, each connecting corresponding pipe ends, is adapted to support the pipes in substantially coaxial, radially spaced relationship, as well as to to provide a fluid-tight seal for the annular space between the inner and outer pipes.

The multiple-section conduit assembly includes conduit sections successively joined together in axial alignment by appropriate joining means. The joining means positions conforming frusto-conical surfaces of the respective structures in mutually confronting, spaced relationship. This mutual spacing establishes an interspace of substantially frusto-conical shape, which communicates with the interior of the inner pipes. In one mode of operation when the assembly is vertically positioned and the frusto-conical surfaces slope downwardly and outwardly from the common axis of the assembly, the interspace serves as a trap for condensate of the fluid flowing through the inner pipes.

DETAILED DESCRIPTION OF THE INVENTION

Figure 1:
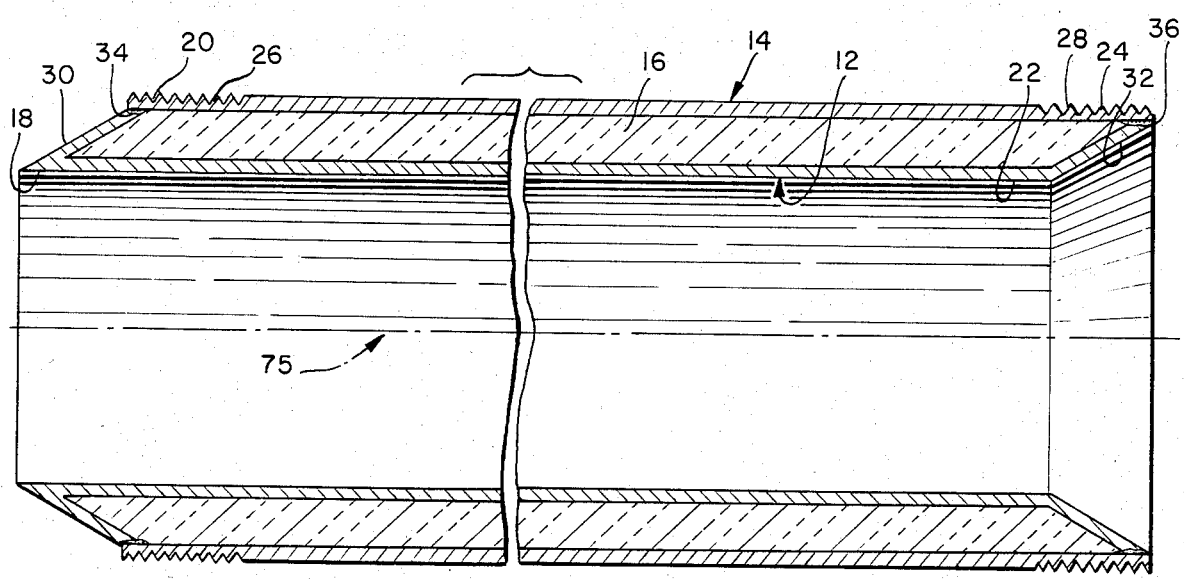
FIG. 1 is a cross-sectional view of a single conduit section in accordance with the principles of this invention.

FIG. 1 is a cross-sectional view of an embodiment of a conduit section constructed in accordance with the principles of the present invention. An outer pipe 14 coaxially surrounds an inner pipe 12, the common axis being designated by the reference numeral 75. A substantially annular space 16, formed between the inner and outer pipes, is filled with insulation, as indicated by suitable cross-hatching in the various Figures of the drawings.

Pipes 12 and 14 are axially displaced with respect to each other, such that a first pipe end 18 of inner pipe 12 extends a predetermined distance beyond the corresponding first pipe end 20 of outer pipe 14, i.e. end 18 leads end 20. A second pipe end 22 of pipe 12 lags the corresponding pipe end 24 of pipe 14. Ends 20, 24 of pipe 14 have externally threaded portions 26 and 28, respectively.

A pair of frusto-conical structures 30 and 32 support the pipes in coaxial, radially spaced relationship. Structure 30 connects end 18 of the inner pipe to end 20 of the outer pipe. Similarly, structure 32 connects end 22 of the inner pipe with end 24 of the outer pipe. In one embodiment of the invention, the frusto-conical structures may be integral with pipe 12, each taking the form of a swaged pipe flange. In the latter arrangement, flange 30 is bent outward by approximately 270°, while flange 32 is bent outward about 30°. Thus, both flanges have a 30° angle of inclination relative to the axis 75. Where structures 30 and 32 constitute flanges integral with pipe 12, they are welded at locations 34 and 36 to ends 20 and 24 of pipe 14 respectively, to provide fluid-tight sealing of annular space 16. Alternatively, structures 30 and 32 may be fabricated by swaging end portions of outer pipe 14 to provide appropriately inclined flanges which can then be welded to the ends of pipe 12 to provide the aforesaid fluid-tight seal. Still another technique, which is currently preferred, is to swage lagging end 20 of the outer pipe to the appropriate angle and to weld it to leading end 18 of the inner pipe. At the opposite end of the conduit section, lagging end 22 of the inner pipe is swaged to the desired angle and is welded to leading end 24 of the outer pipe.

In one embodiment of this invention, the inner pipe is prestressed in tension and the outer pipe is prestressed in compression. This prestressed configuration is illustrated by U.S. Pat. No. 2,924,245 which is incorporated herein by reference.

In still another embodiment of the invention, structures 30 and 32 may be manufactured as separate and distinct members and each member may be welded to one pair of corresponding, axially displaced pipe ends. In the latter case, four welds are required to seal off annular space 16 and make it fluid-tight.

Figure 2:
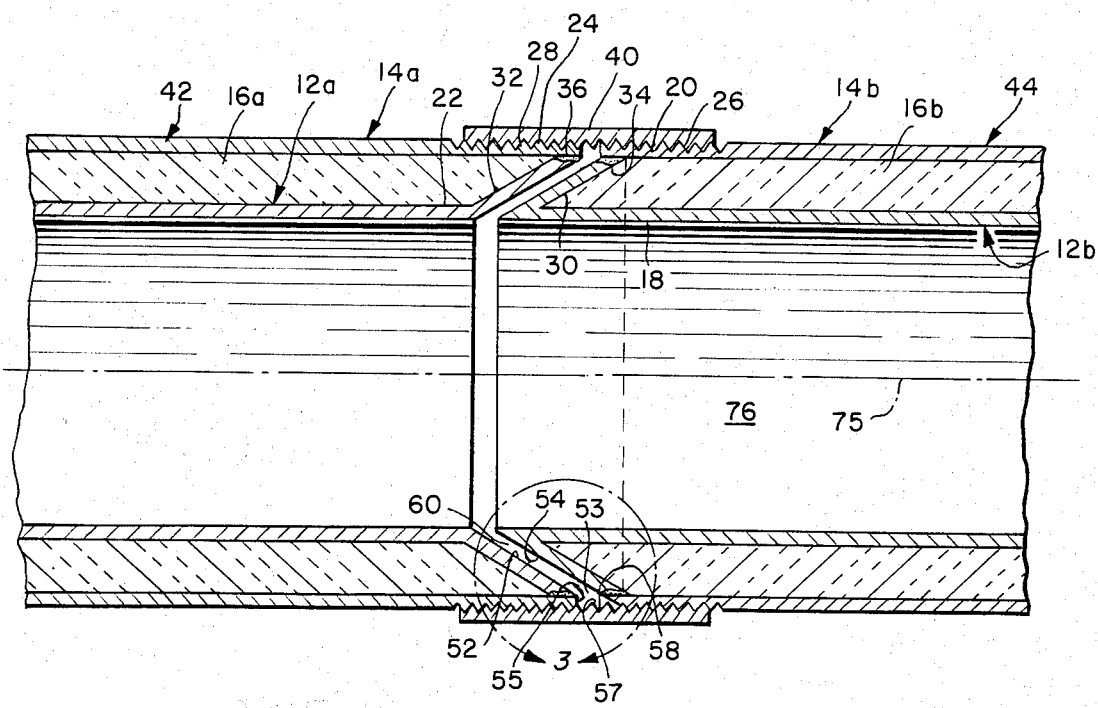
FIG. 2 is a cross-sectional view of a jointed conduit assembly using conduit sections as shown in FIG. 1.

FIG. 2 illustrates a cross-sectional view of the joint between a first conduit section 42 and a second conduit section 44. The reference numerals used to designate the various parts described in connection with FIG. 1 have been carried forward. However, since conduit sections 42 and 44 are substantially identical, the suffixes "a" and "b" designate parts belonging to conduit sections 42 and 44 respectively, whenever clarity in the following discussion demands that a distinction be maintained.

Figure 3:
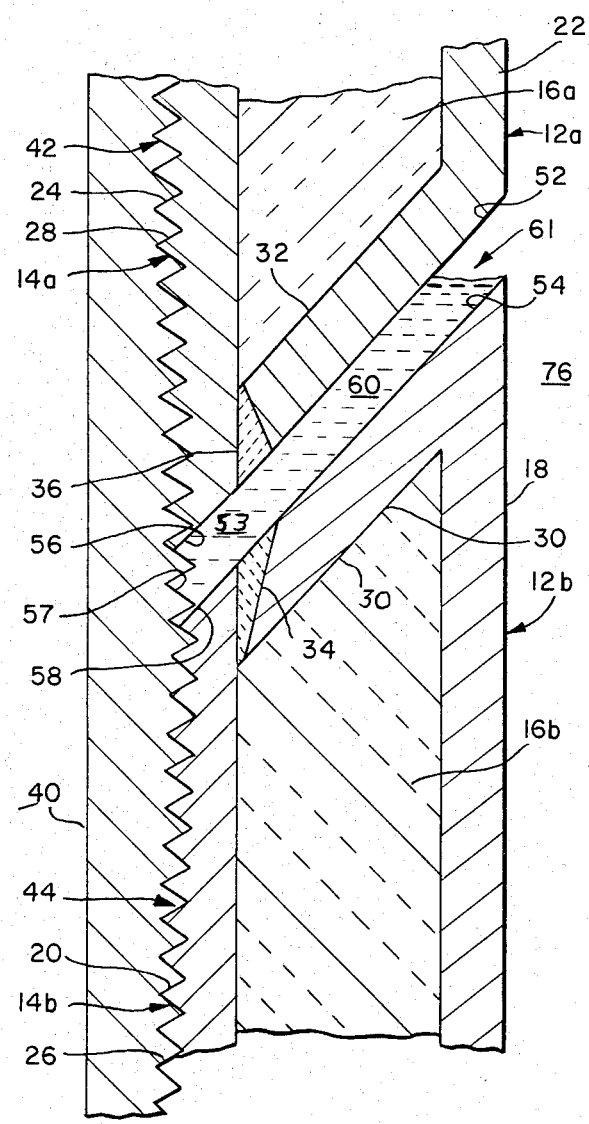
FIG. 3 is a detailed cut-away view of joint between successive conduit sections.

In order to join two or more conduit sections into a conduit assembly, an internally threaded coupling 40 or sleeve is adapted to engage external threads 26 and 28 on the outer surface of pipe 14 and to form a substantially fluid tight seal therewith. Further, coupling 40 holds conduit section 42 in axial alignment with conduit section 44. Structures 30 and 32 have first and second conforming frusto-conical surfaces 52 and 54 of conduit sections 42 and 44 respectively. When assembled, surfaces 52 and 54 are held in mutually confronting, spaced relationship such that the contoured ends are fit together. The spacing established by coupling 40 between the two frusto-conical surfaces is small compared to the inside diameter of the inner pipes 12a and 12b. Further, this spacing defines a frusto-conical interspace which is designated by the reference numeral 60 in FIGS. 2 and 3, FIG. 3 illustrating in greater detail the joint between conduit sections 42 and 44.

Edge surfaces 56 and 58 of pipe ends 24 and 20 respectively are similarly spaced. Thus, coupling 40 is effective to establish peripheral gap 53 between the latter surfaces. This gap, together with interspace 60, constitutes a volume of space which communicates with the interior 76 of axially aligned inner pipes 12a and 12b.

Figure 4:
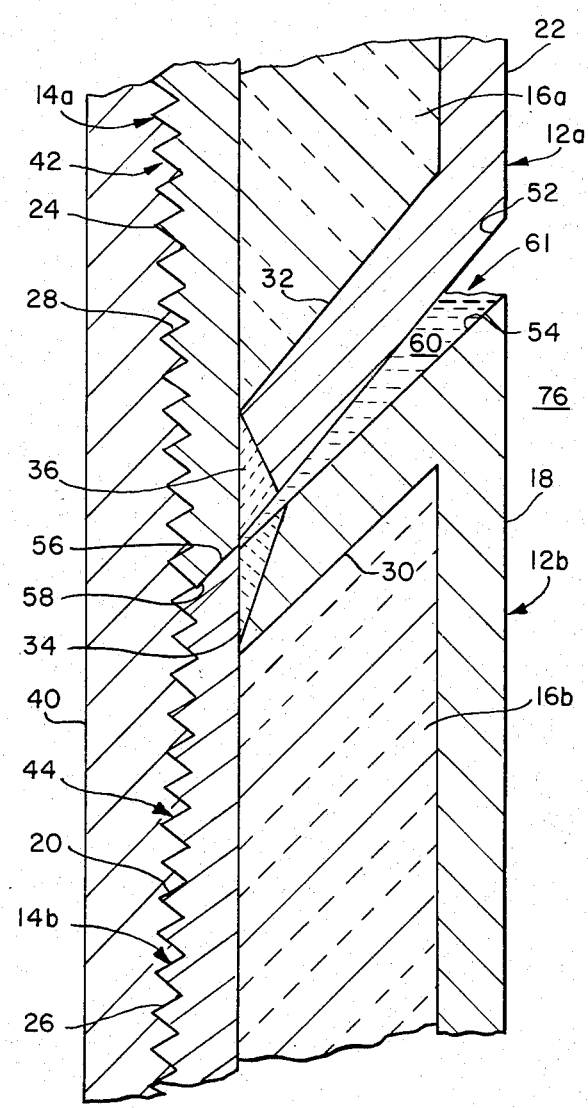
FIG. 4 is a detailed cut-away view of another embodiment of the joint between successive conduit sections.

FIG. 4 is a detailed cut-away view of an alternative embodiment of the joint between successive conduit sections. Applicable reference numerals have been carried forward from FIG. 3 since the parts are substantially identical. In this embodiment, edge surfaces 56 and 58 of pipe ends 24 and 20 respectively, abut each other.

Each joint of the conduit assembly described hereinabove can be easily assembled and disassembled because the coupling is removably threaded onto the exterior surfaces of the outer pipes. Since the spacing between mutually confronting frusto-conical surfaces 52 and 54 may be such that these surfaces converge in a downward direction, as shown in FIG. 4, edge surfaces 56 and 58 of outer pipes 14a and 14b of the successive conduit sections may actually abut each other.

In operation, the multiple-section conduit assembly is preferably positioned with its common axis 75 substantially vertical. As illustrated in FIG. 3, frusto-conical interspace 60 slopes in a downward direction and away from the common axis. Fluid flow, which may be liquid or gas flow, is assumed to be from top to bottom. In the position shown, gap 53 and interspace 60 is at an acute angle with respect to the direction of the fluid flow and serve as a trap to catch or capture any condensate of such gaseous fluid as it flows in an axial direction from top to bottom through the inner pipes. The pressure of the fluid and/or the force of gravity serves to guide the condensate into the interspace such that it remains trapped there.

For purposes of illustration, let it be assumed that the fluid constitutes live steam which flows in a downward direction from conduit section 42 to conduit section 44 in the assembly illustrated by FIGS. 3 and 4. In normal operation, condensate will form on the coolest parts of the assembly. Hence in the assembly shown in FIG. 3, the condensate will begin to form on the inner coupling surface 57 since the outside of coupling 40 is in contact with the cooler ambient environment. The pressure of the steam and/or the force of gravity traps the condensate in peripheral gap 53. As condensate continues to form and accumulate, the liquid rises and ultimately reaches level 61 in interspace 60, as shown in FIG. 3. Any further accumulation drains into interior 76 and is carried away with the axially directed fluid flow. Thus, gap 53 and interspace 60 together form a thermal barrier trap in which the condensate resides.

The joint between successive conduit sections must also provide the multiple-section conduit assembly with relief from thermal stress, in addition to providing an acceptable degree of thermal insulation. Specifically, by transferring the expansion/contraction forces generated by the inner pipe to the outer pipes of each conduit section through the agency of structures 30 and 32, the outer pipe serves to partially relieve the thermal stress and strain forces developed in the inner pipe. Further, when the condensate is at level 61, the steam flowing through interior 76 is thermally isolated from the ambient environment by coupling 40 and by a relatively long path through the interspace. The latter is filled with condensate whose thermal gradient will vary from the temperature of the steam at interior 76 to near the temperature at coupling 40 thereby creating a thermal barrier trap. Further in each conduit section thermal insulation is provided by the sealed annular space 16 between the inner and outer pipes, which space preferably contains a thermal insulative material.

To minimize heat loss through the joint in a preferred embodiment of the invention, frusto-conical surfaces 52 and 54 are both at a 30° angle of inclination relative to common axis 75. In such an arrangement, the insulation, which is contained in annular spaces 16a and 16b immediately adjacent to the joint, presents an effective thermal barrier against any appreciable transfer of heat therethrough. Further, at this particular angle of inclination, structures 30 and 32 are of sufficient length to limit any appreciable transfer of heat through the structures. Together with the accumulated condensate liquid trapped in gap 53 and interspace 60, an efficient thermal barrier is presented by the joint, between the ambient environment surrounding coupling 40 and the live steam in interior 76. Since the spacing between surfaces 52 and 54 is relatively small compared to the inside diameter of the inner pipes, fluid flow through the interior of the inner pipes will have not create any appreciable currents in the condensate which would affect the thermal gradient therein and the insulation of the joint.

At inclination angles greater than 30°, the physical length of structures 30 and 32, as well as the length of interspace 60, are decreased and the joint becomes thermally less efficient. However, such an arrangement may nevertheless be desirable because thicker structures 30 and 32 and greater angles may enhance the ability of the structures to transfer the expansion/contraction forces. As stated above, these forces result from the flow of fluids at relatively high temperatures and pressures in the inner pipe relative to the outer pipe. Angles of inclination less than 30° are not as thermally efficient, because less insulative material is disposed proximate the joint in annular space 16. This smaller amount of insulative material and the smaller physical distance between inner pipe end 18 and structure 30 through annular space 16b, allows an appreciable amount of heat to flow therethrough. However, a smaller angle of inclination may be desirable due to the transposition of the aforementioned forces acting on the inner and the outer pipes.

The multiple-section conduit assembly disclosed herein performs optimally when its common axis 75 is positioned substantially vertical and the frusto-conical surfaces slope downward toward gap 53 and outward from axis 75, as shown in FIG. 3. However, the invention is not so limited and the assembly can also operate in different positions, e.g. horizontally. In all such instances the direction of the fluid flow must be such that gap 53 is positioned downstream with respect to the point where interspace 60 communicates with pipe interior 76. Since gravity is only partially, or not at all, relied upon in such an arrangement, the pressure in pipe 12 must be such that the fluid condensate is forced into the gap and interspace and remains trapped there.

The conduit assembly described herein may be modified in structure without departing from the principles of the present invention. For example, the conduit assembly may be used to transport fluids which are colder than the ambient environment. It is also possible to substitute other suitable joining means for coupling 40, i.e., flanges attached to the outer pipes with bolts therethrough. Further, the coupling may be welded to the outer pipes in lieu of the use of threads. Both welding and threading may be used to join the conduit sections together.

From the foregoing discussion it will be clear that the present invention is not limited to the apparatus specifically disclosed herein, but that numerous modifications, partial and complete substitutions, equivalents and changes will now occur to those skilled in the art, all of which fall within the scope of the invention. Accordingly, it is intended that the invention disclosed herein be limited only by the spirit and scope of the appended claims.

We claim:

1. A multiple-section conduit assembly for transporting fluid downwardly in relative thermal isolation with respect to the ambient environment, said conduit assembly comprising, in combination:

at least a pair of adjacent conduit sections arranged in vertical, end-to-end relation, each said conduit section including an inner pipe adapted to carry said fluid and having first and second ends, an outer pipe having first and second ends, said outer pipe surrounding said inner pipe in each conduit section in substantially coaxial relationship to define an annular space therebetween and being axially displaced with respect to said inner pipe such that said first and second ends of said inner pipe lead and lag respectively the corresponding ends of said outer pipe, a frusto-conical structure connecting each pair of corresponding axially displaced pipe ends in each of said conduit sections, a pair of said structures of each coaxial section being adapted to support said coaxial pipes in radially spaced relationship and to provide a fluid tight seal of said annular space, each of said structures including at least one substantially frusto-conical surface adapted to confront a corresponding surface of the adjacent conduit section, said confronting frusto-conical surfaces defining therebetween an interspace of substantially frusto-conical configuration sloping downwardly and outwardly from an open inner end defined between the ends of said inner pipes of the adjacent conduit sections to an outer end defined between the ends of said outer pipes of the adjacent conduit sections, whereby said interspace is in unobstructed, free flowing communication with the fluid-carrying interior of said inner pipes of the adjacent conduit sections and therefore adapted to fill with liquid in the presence of fluid in said inner pipe to provide a thermal barrier trap between the interior of said inner pipes and the ambient environment; and means for joining the adjacent conduit sections and seaing off said outer end of said interspace.

2. A conduit assembly in accordance with claim 1 wherein each of said frusto-conical surfaces has substantially a 30° angle of inclination relative to the common axis of said conduit assembly.

3. A conduit assembly in accordance with claim 1 wherein said confronting frusto-conical surfaces converge in a direction away from the common axis of said conduit assembly.

4. A conduit assembly in accordance with claim 1 wherein said outer pipes each include an externally threaded portion in the vicinity of each pipe end; and wherein said joining means includes an internally threaded coupling adapted to engage said externally threaded portions of said outer pipes for each pair of successive conduit sections.

5. A conduit assembly in accordance with claim 1 wherein each of said frusto-conical structures is integral with at least one of the pipes of the corresponding conduit section and is affixed in fluid-sealing relationship to the other pipe of said conduit section.

* * * * *